US012580263B2

(12) United States Patent
Yoshida et al.

(10) Patent No.: US 12,580,263 B2
(45) Date of Patent: Mar. 17, 2026

(54) BATTERY PACK

(71) Applicant: PRIME PLANET ENERGY & SOLUTIONS, INC., Tokyo (JP)

(72) Inventors: Naotake Yoshida, Himeji (JP); Satoru Matsuyama, Kasai (JP); Ryohei Honda, Himeji (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 613 days.

(21) Appl. No.: 18/147,109

(22) Filed: Dec. 28, 2022

(65) Prior Publication Data

US 2023/0246278 A1 Aug. 3, 2023

(30) Foreign Application Priority Data

Feb. 2, 2022 (JP) ................................. 2022-014779

(51) Int. Cl.
| | |
|---|---|
| *H01M 50/242* | (2021.01) |
| *H01M 10/42* | (2006.01) |
| *H01M 50/209* | (2021.01) |

(52) U.S. Cl.
CPC ....... *H01M 50/242* (2021.01); *H01M 10/425* (2013.01); *H01M 50/209* (2021.01)

(58) Field of Classification Search
CPC . H01M 50/242; H01M 50/209; H01M 10/425
USPC .......................................................... 429/7
See application file for complete search history.

(56) References Cited

U.S. PATENT DOCUMENTS

| | | | |
|---|---|---|---|
| 2009/0191448 A1* | 7/2009 | Yamamoto .......... | H01M 50/124 264/261 |
| 2018/0050606 A1* | 2/2018 | Sugitate ................ | B60K 11/06 |
| 2023/0090932 A1 | 3/2023 | Misawa | |

FOREIGN PATENT DOCUMENTS

| | | |
|---|---|---|
| JP | 2003-045392 A | 2/2003 |
| JP | 2006-306249 A | 11/2006 |
| WO | WO 2016/143214 A1 | 9/2016 |
| WO | WO 2021/177150 A1 | 9/2021 |

* cited by examiner

*Primary Examiner* — Allison Bourke
*Assistant Examiner* — Robert Gene West
(74) *Attorney, Agent, or Firm* — Finnegan, Henderson, Farabow, Garrett and Dunner, LLP

(57) ABSTRACT

A battery pack includes: a plurality of battery cells; an electronic component unit including an electronic component and a housing that accommodates the electronic component; and a case member that accommodates the plurality of battery cells and the electronic component unit. The housing of the electronic component unit has a bottom surface. The case member has a floor surface that supports the bottom surface of the housing, and the floor surface of the case member includes a first floor surface portion extending along a first plane and a second floor surface portion extending along a second plane obliquely intersecting the first plane.

19 Claims, 6 Drawing Sheets

BATTERY PACK

This nonprovisional application is based on Japanese Patent Application No. 2022-014779 filed on Feb. 2, 2022 with the Japan Patent Office, the entire contents of which are hereby incorporated by reference.

BACKGROUND OF THE INVENTION

Field of the Invention

The present technology relates to a battery pack.

Description of the Background Art

There has been conventionally known a battery pack having a case member with an inner space in which battery cells and an electronic component unit are accommodated. Such a battery pack is shown, for example, in each of Japanese Patent Laying-Open No. 2006-306249 and WO 2016/143214.

SUMMARY OF THE INVENTION

When such a battery pack is fed with a load in a lateral direction upon collision of a vehicle or the like, the impact load in the lateral direction may also act on the electronic component unit accommodated in the case member. It is considered to provide another mechanism to absorb the impact load; however, the inner space of the case member cannot be effectively utilized when the mechanism is large in size. Further, by providing the impact absorbing mechanism as a separate mechanism, the number of components, the number of assembling steps, and the weight of the battery pack can be increased.

It is an object of the present technology to provide a battery pack to reduce an impact load on an electronic component unit when fed with a load in a lateral direction.

A battery pack according to the present technology includes: a plurality of battery cells; an electronic component unit including an electronic component and a housing that accommodates the electronic component; and a case member that accommodates the plurality of battery cells and the electronic component unit. The housing of the electronic component unit has a bottom surface.

In one aspect, the case member has a floor surface that supports the bottom surface of the housing, and the floor surface of the case member includes a first floor surface portion extending along a first plane and a second floor surface portion extending along a second plane obliquely intersecting the first plane.

In another aspect, the case member has a floor surface that supports the bottom surface of the housing, and an upper surface that faces the floor surface, and the upper surface of the case member extends along a first plane and the floor surface of the case member includes a portion that extends along a second plane obliquely intersecting the first plane.

The foregoing and other objects, features, aspects and advantages of the present invention will become more apparent from the following detailed description of the present invention when taken in conjunction with the accompanying drawings.

Figure 5:
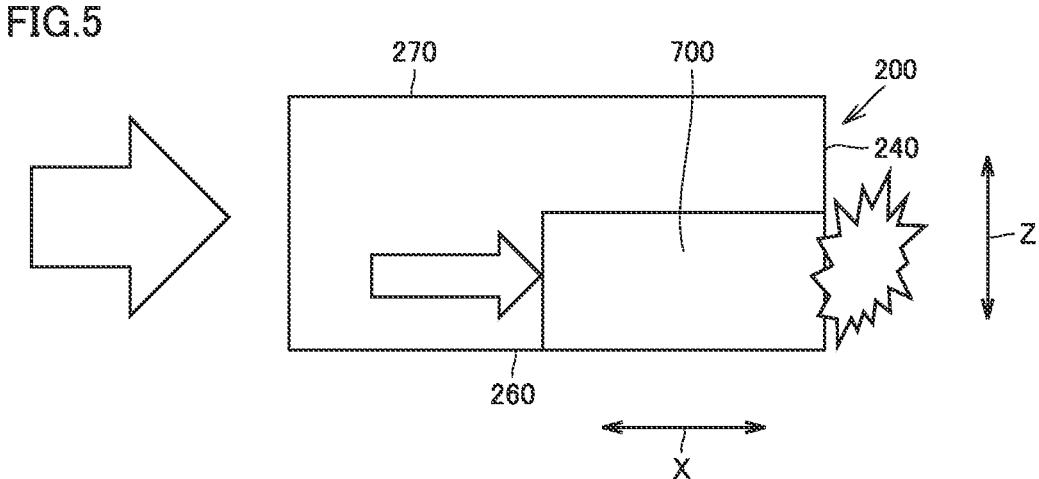
Figure 6:
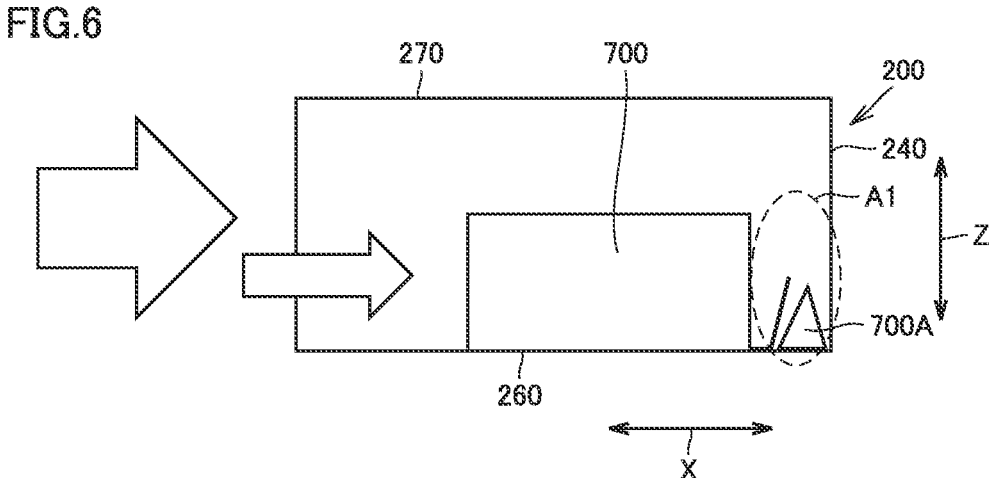

Each of FIGS. 5 and 6 schematically shows a battery pack according to a reference example.

Figure 7:
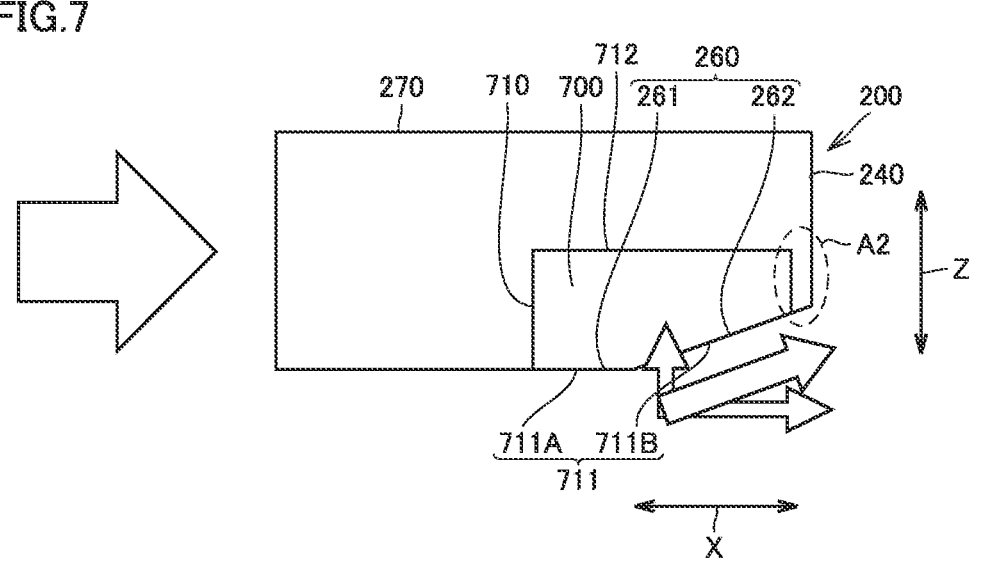

FIG. 7 is a diagram schematically showing a battery pack according to one embodiment.

Figure 8:
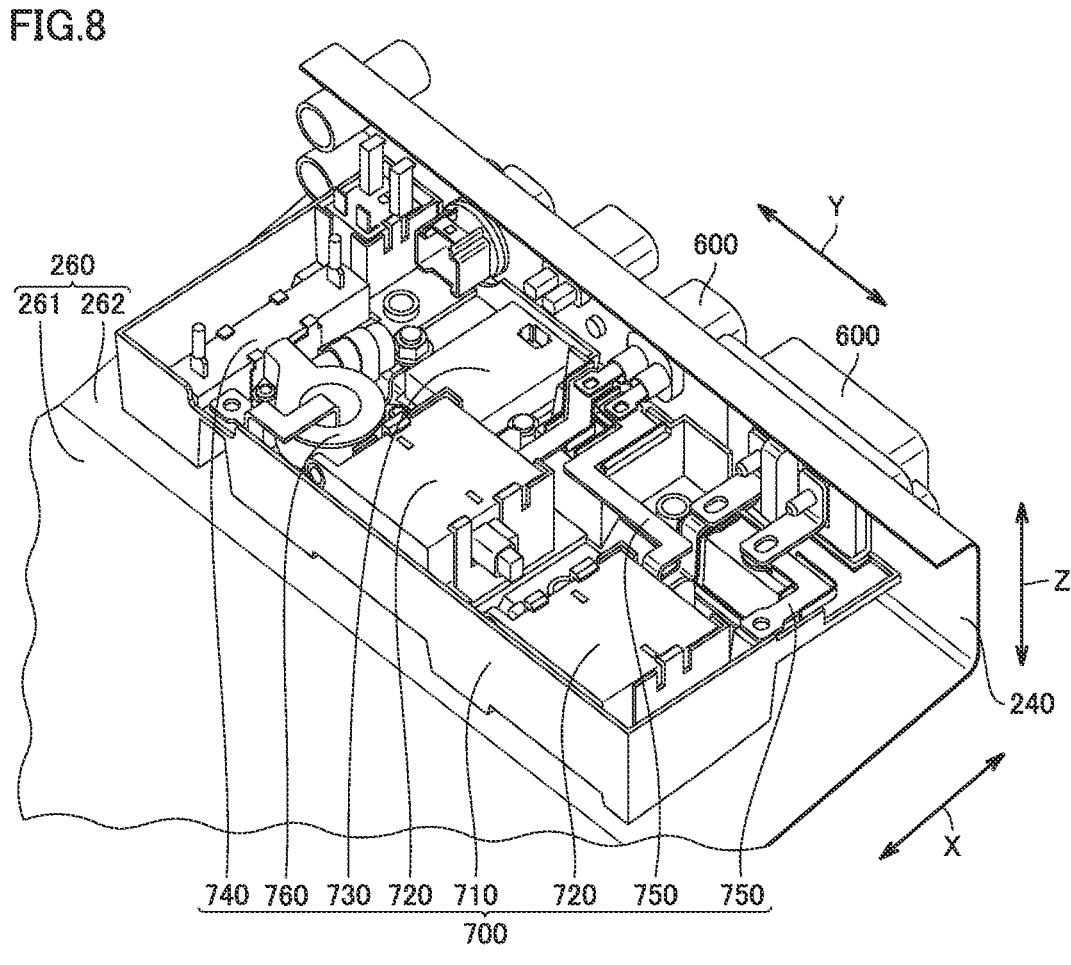

FIG. 8 is a perspective view showing surroundings of an electronic component unit in the battery pack.

Figure 9:
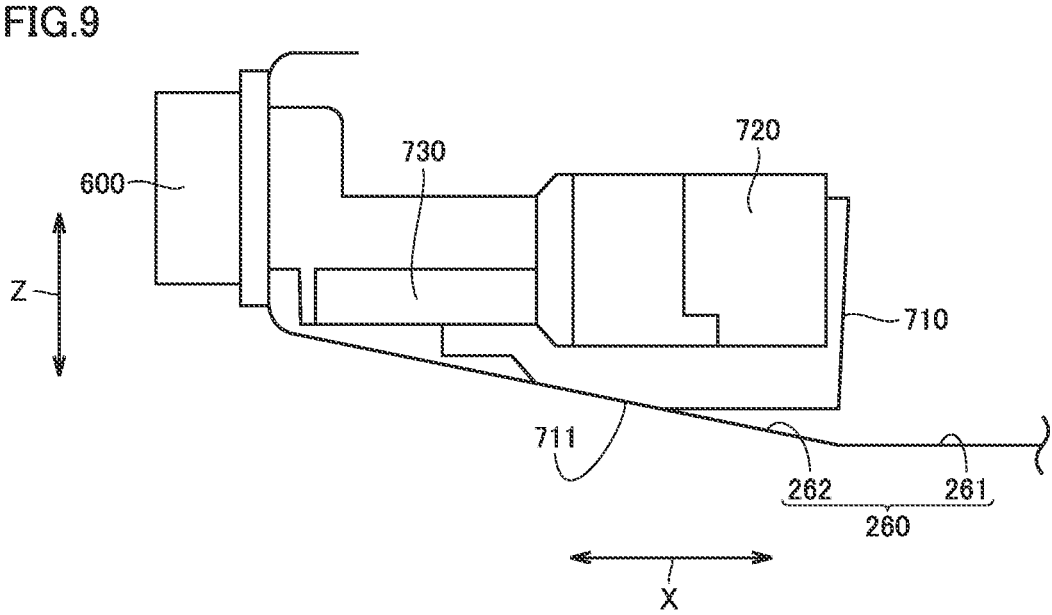

FIG. 9 is a diagram showing a state of the electronic component unit shown in FIG. 8 when viewed in a Y axis direction.

Figure 10A:
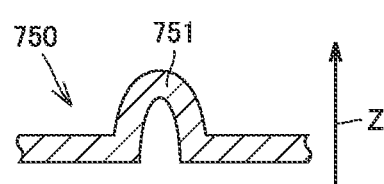
Figure 10B:
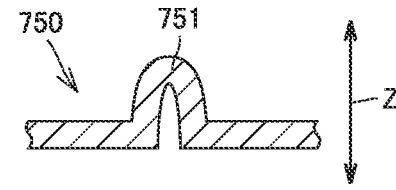

Each of FIGS. 10A and 10B is a diagram showing a cushioning structure formed at a bus bar.

Figure 11:
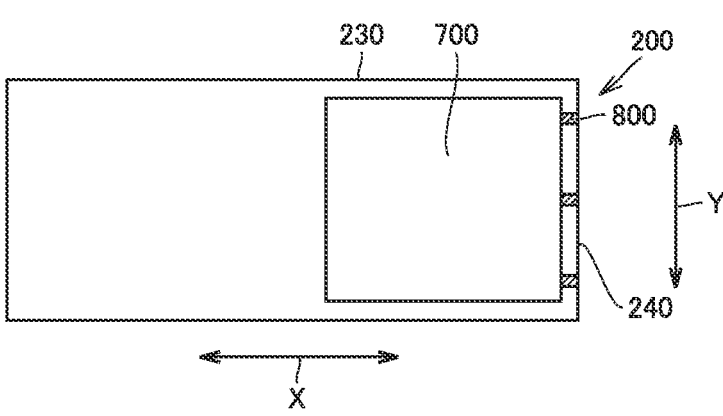

FIG. 11 is a top view showing an exemplary arrangement of a cushioning material.

Figure 12:
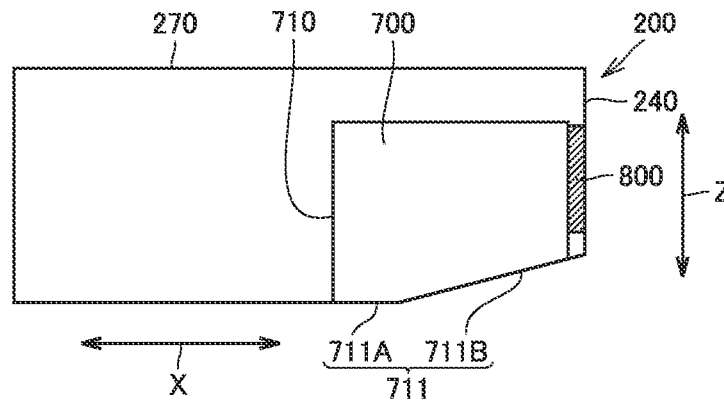

FIG. 12 is a side view of the structure shown in FIG. 11.

Figure 13:
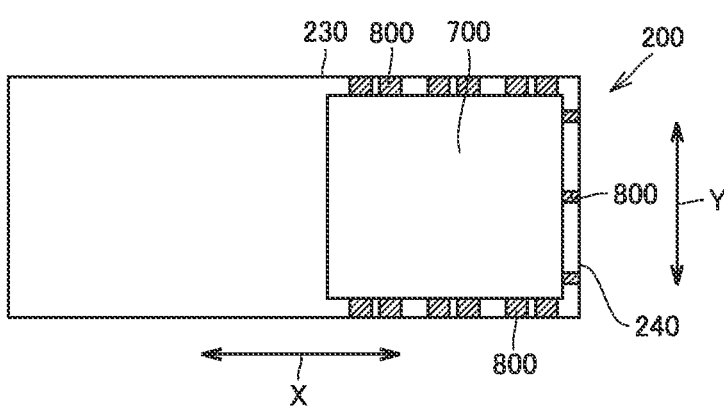

FIG. 13 is a top view showing another exemplary arrangement of the cushioning material.

Figure 14:
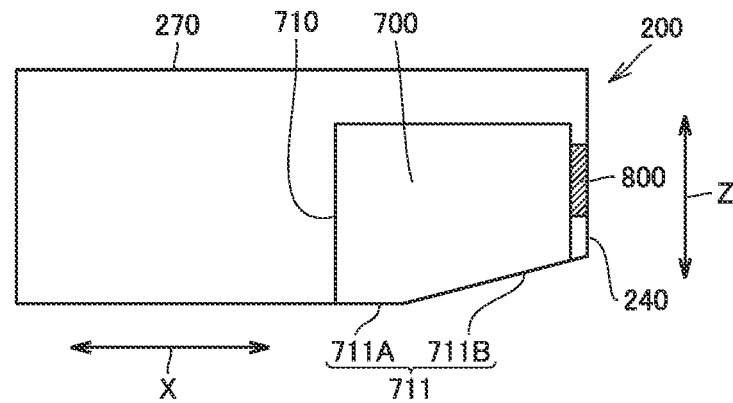

FIG. 14 is a side view of the structure shown in FIG. 13.

Figure 15:
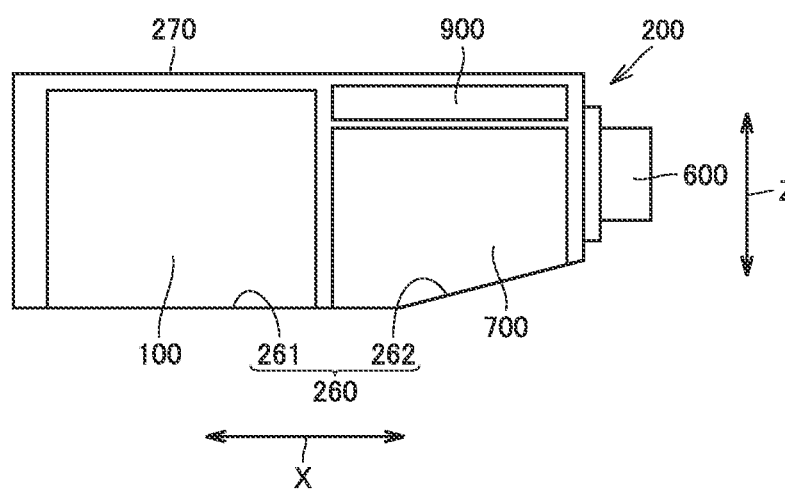

FIG. 15 is a diagram showing an exemplary arrangement of respective configuration units in the battery pack.

DESCRIPTION OF THE PREFERRED EMBODIMENTS

Hereinafter, embodiments of the present technology will be described. It should be noted that the same or corresponding portions are denoted by the same reference characters, and may not be described repeatedly.

It should be noted that in the embodiments described below, when reference is made to number, amount, and the like, the scope of the present technology is not necessarily limited to the number, amount, and the like unless otherwise stated particularly. Further, in the embodiments described below, each component is not necessarily essential to the present technology unless otherwise stated particularly. Further, the present technology is not limited to one that necessarily exhibits all the functions and effects stated in the present embodiment It should be noted that in the present specification, the terms "comprise", "include", and "have" are open-end terms. That is, when a certain configuration is included, a configuration other than the foregoing configuration may or may not be included.

Also, in the present specification, when geometric terms and terms representing positional/directional relations are used, for example, when terms such as "parallel", "orthogonal", "obliquely at 45°", "coaxial", and "along" are used, these terms permit manufacturing errors or slight fluctuations. In the present specification, when terms representing relative positional relations such as "upper side" and "lower side" are used, each of these terms is used to indicate a relative positional relation in one state, and the relative positional relation may be reversed or turned at any angle in accordance with an installation direction of each mechanism (for example, the entire mechanism is reversed upside down).

In the present specification, the term "battery" is not limited to a lithium ion battery, and may include other batteries such as a nickel-metal hydride battery and a sodium ion battery.

In the present specification, the term "battery cell" is not necessarily limited to a prismatic battery cell and may include a cell having another shape, such as a cylindrical battery cell, a pouch battery cell, or a blade battery cell. The "battery cell" can be mounted on vehicles such as a hybrid electric vehicle (HEV), a plug-in hybrid electric vehicle (PHEV), and a battery electric vehicle (BEV). It should be noted that the use of the "battery cell" is not limited to the use in a vehicle.

Figure 1:
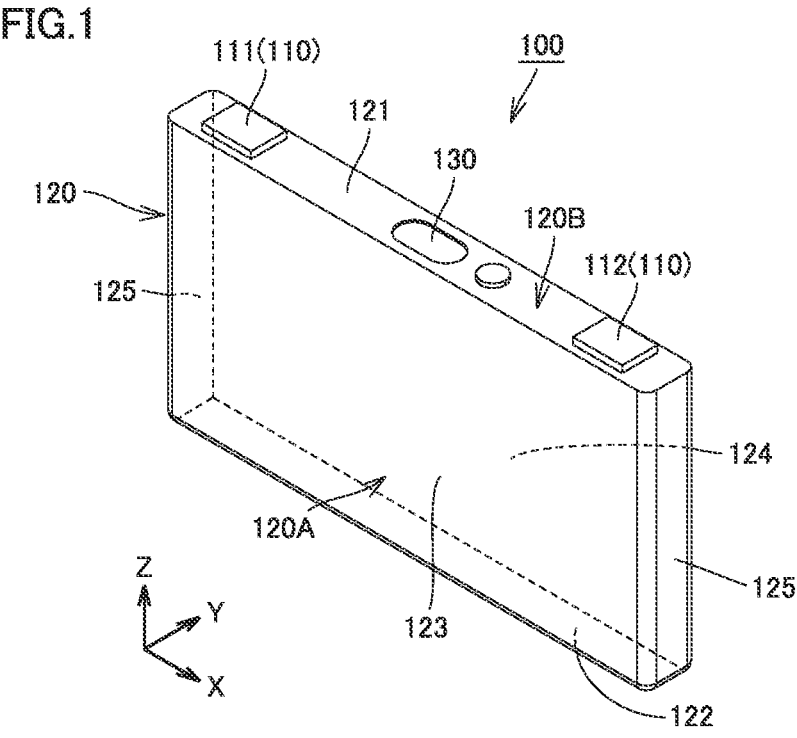
FIG. 1 is a perspective view showing a battery cell.

FIG. 1 is a perspective view showing a battery cell 100. As shown in FIG. 1, battery cell 100 has a prismatic shape. Battery cell 100 has electrode terminals 110, a housing 120, and a gas-discharge valve 130.

Electrode terminals 110 are formed on housing 120. Electrode terminals 110 have a positive electrode terminal 111 and a negative electrode terminal 112 arranged side by side along an X axis direction (second direction) orthogonal to a Y axis direction (first direction). Positive electrode terminal 111 and negative electrode terminal 112 are provided to be separated from each other in the X axis direction.

Housing 120 has a rectangular parallelepiped shape and forms an external appearance of battery cell 100. Housing 120 includes: a case body 120A that accommodates an electrode assembly (not shown) and an electrolyte solution (not shown); and a sealing plate 120B that seals an opening of case body 120A. Sealing plate 120B is joined to case body 120A by welding.

Housing 120 has an upper surface 121, a lower surface 122, a first side surface 123, a second side surface 124, and two third side surfaces 125.

Upper surface 121 is a flat surface orthogonal to the Y axis direction and a Z axis direction (third direction) orthogonal to the X axis direction. Electrode terminals 110 are disposed on upper surface 121. Lower surface 122 faces upper surface 121 along the Z axis direction.

Each of first side surface 123 and second side surface 124 is constituted of a flat surface orthogonal to the Y axis direction. Each of first side surface 123 and second side surface 124 has the largest area among the areas of the plurality of side surfaces of housing 120. Each of first side surface 123 and second side surface 124 has a rectangular shape when viewed in the Y axis direction. Each of first side surface 123 and second side surface 124 has a rectangular shape in which the X axis direction corresponds to the long-side direction and the Z axis direction corresponds to the short-side direction when viewed in the Y axis direction.

A plurality of battery cells 100 are stacked such that first side surfaces 123 of battery cells 100, 100 adjacent to each other in the Y direction face each other and second side surfaces 124 of battery cells 100, 100 adjacent to each other in the Y axis direction face each other. Thus, positive electrode terminals 111 and negative electrode terminals 112 are alternately arranged in the Y axis direction in which the plurality of battery cells 100 are stacked.

Gas-discharge valve 130 is provided in upper surface 121. When the temperature of battery cell 100 is increased (thermal runaway) and internal pressure of housing 120 becomes more than or equal to a predetermined value due to gas generated inside housing 120, gas-discharge valve 130 discharges the gas to outside of housing 120.

Figure 2:
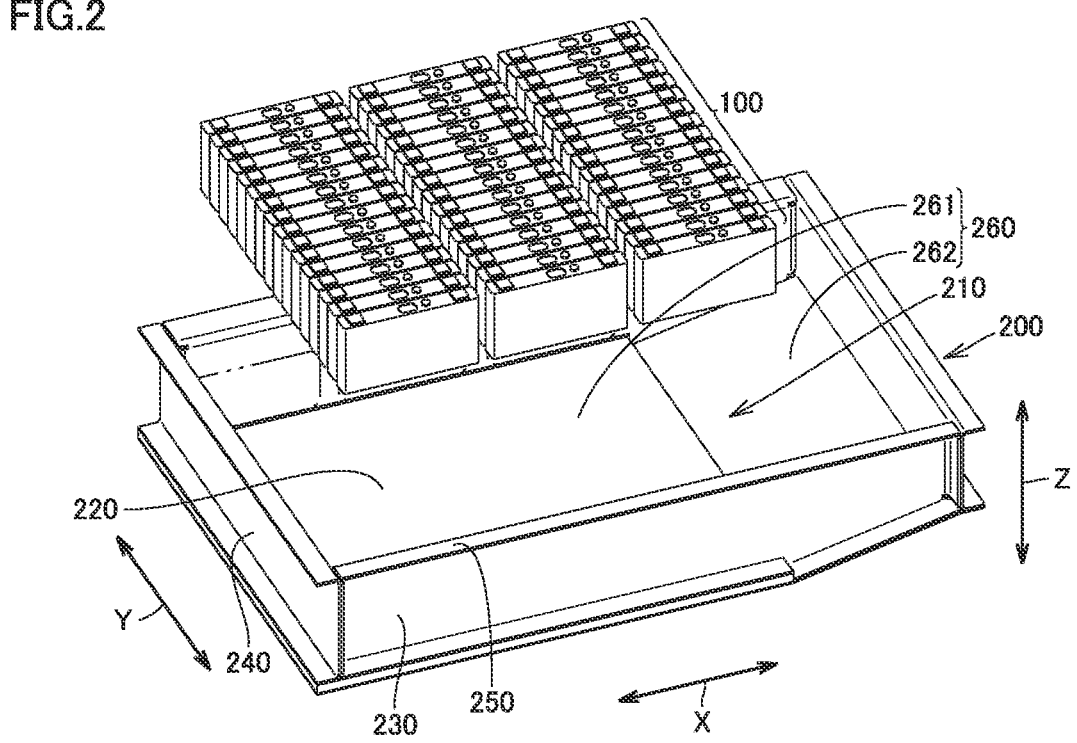
FIG. 2 is a perspective view showing battery cells and a case member that accommodates the battery cells.
Figure 3:
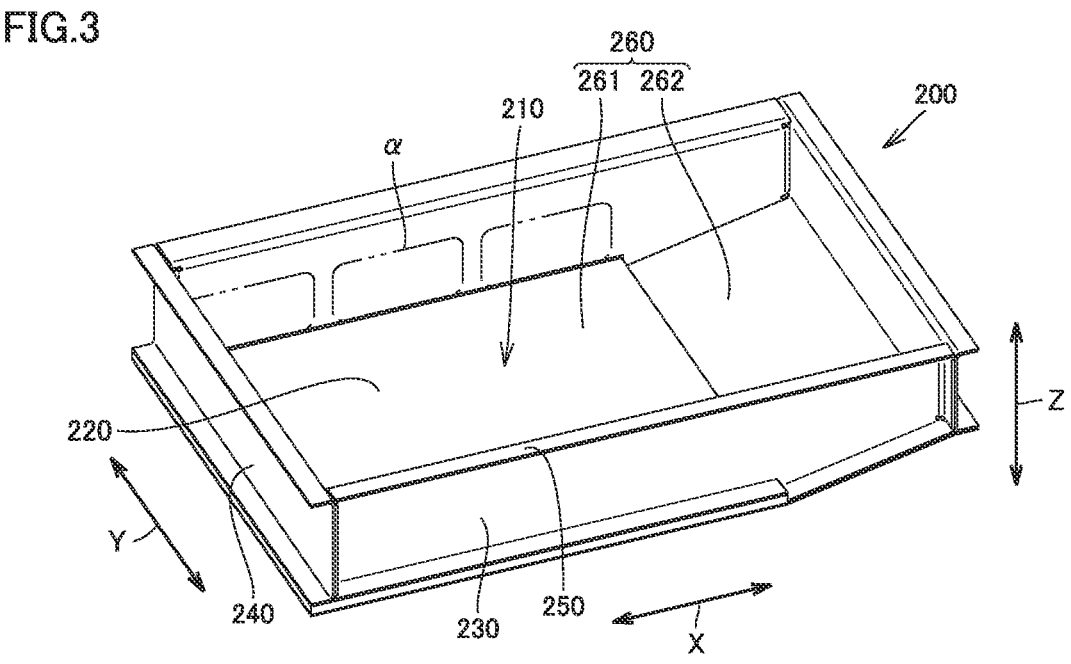
FIG. 3 is a perspective view showing the case member (except for a cover portion) of a battery pack.

Each of FIGS. 2 and 3 is a perspective view showing case member 200 that accommodates battery cells 100. In each of FIGS. 2 and 3, for convenience of illustration, a below-described cover portion of case member 200 is not shown.

As shown in FIGS. 2 and 3, case member 200 includes an inner space 210, a cooling plate 220, side surface portions 230, 240, and flange portions 250.

Inner space 210 accommodates stacks (battery assemblies) of the plurality of battery cells 100 stacked in the Y axis direction. The battery assemblies are arranged in three rows in the X axis direction. Cooling plate 220 and side surface portions 230, 240 define inner space 210.

Cooling plate 220 constitutes at least a portion of a floor surface 260 of case member 200. In the example shown in FIGS. 2 and 3, floor surface 260 includes a first floor surface portion 261 extending in a direction of X-Y plane (first plane) and a second floor surface portion 262 extending in a direction of plane (second plane) obliquely intersecting the direction of X-Y plane, and cooling plate 220 constitutes first floor surface portion 261. The stacks of battery cells 100 are placed on cooling plate 220. Coolant is supplied into cooling plate 220. Water is used as the coolant, but it is not limited thereto.

Each of side surface portions 230 extends in a direction orthogonal to the Y axis direction. Each of side surface portions 240 extends in a direction orthogonal to the X axis direction. Side surface portions 230, which are located on both sides in the Y axis direction with respect to the stacks (including separators) of battery cells 100 and extend in the direction orthogonal to the Y axis direction, directly support the stacks of battery cells 100 (Cell-to-Pack structure). At portions a in FIG. 3, the stacks of battery cells 100 are in abutment with side surface portions 230.

It should be noted that case member 200 is not limited to one in which side surface portions 230 directly supports the stacks of battery cells 100, and may be one (Cell-Module-Pack structure) in which a battery module including the plurality of battery cells 100 is accommodated.

Flange portions 250 are formed at upper end portions of side surface portions 230, 240, i.e., at their end portions opposite to cooling plate 220. Flange portions 250 are formed to be separated from cooling plate 220 along the Z axis direction and are formed in parallel with cooling plate 220. Flange portions 250 protrude from side surface portions 230, 240 in the same direction as cooling plate 220.

Figure 4:
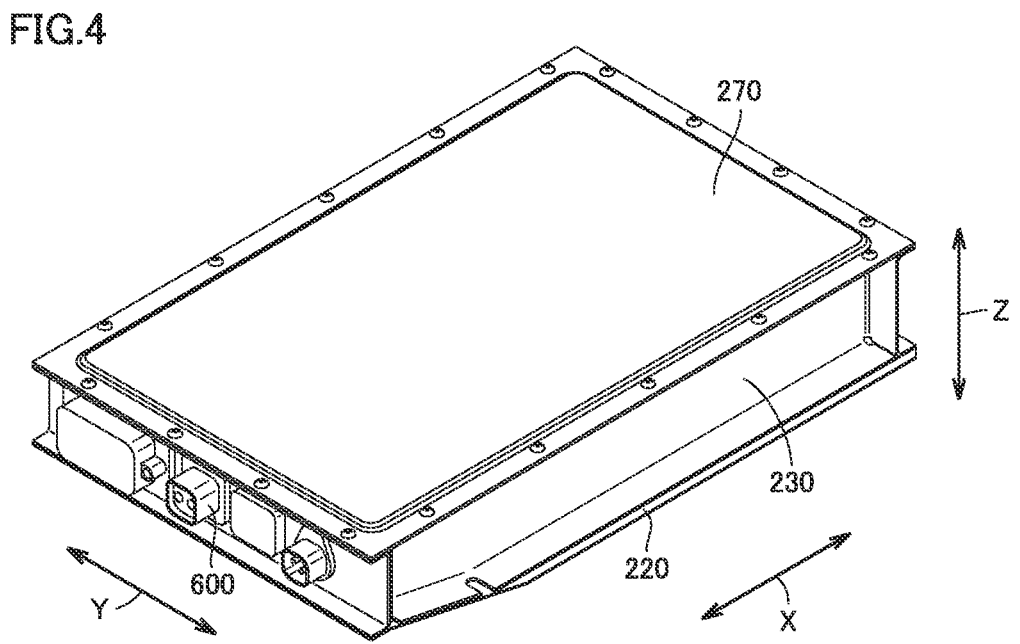
FIG. 4 is an external view of the battery pack.

FIG. 4 is an external view of a battery pack. As shown in FIG. 4, a cover member 270 is assembled to flange portions 250 to seal inner space 210 of case member 200. The battery pack further includes a connector 600. Connector 600 serves as a portion of a power supply path to battery cells 100 and electrical components accommodated in case member 200. Connector 600 is connected to an external wiring.

Each of FIGS. 5 and 6 is a diagram schematically showing a battery pack according to a reference example. In the example of FIGS. 5 and 6, an electronic component unit 700 is accommodated in a case member 200 Electronic component unit 700 is formed as a unit by accommodating electronic components, such as a sensor, a relay, a resistor, and a control circuit board, in a housing. The electronic components include: an active component (such as a transistor) including an active element; a passive component (such as a resistor) including a passive element; and an auxiliary component (such as a bus bar) for connecting, disconnecting, or fixing an element.

For example, when case member 200 is fed with a load in a lateral direction (the X axis direction and the Y axis direction) upon collision of the vehicle or the like, the impact load in the lateral direction also acts directly on electronic component unit 700 accommodated in case member 200. As a result, when electronic component unit 700 collides with side surface portion 230 of case member 200 as shown in FIG. 5, an electronic component (electric component or control circuit board) in electronic component unit 700 may be damaged.

In order to absorb the impact load fed to electronic component unit 700, it is conceivable to provide a cushioning mechanism 700A shown in FIG. 6. In order to provide cushioning mechanism 700A that can endure a large impact load, however, cushioning mechanism 700A can be increased in size. As a result, inner space 210 of case member 200 cannot be effectively utilized in a portion A1 in FIG. 6, thus resulting in an increased size of the battery pack. Further, by providing cushioning mechanism 700A, the number of components, the number of assembling steps, and the weight of the battery pack can be increased.

FIG. 7 is a diagram schematically showing the battery pack according to the present embodiment. In the battery pack shown in FIG. 7, case member 200 includes: first floor surface portion 261 extending in the direction of X-Y plane; and second floor surface portion 262 extending in the direction obliquely intersecting the direction of X-Y plane. A bottom surface 711 of a housing 710 of electronic component unit 700 includes: a first bottom surface portion 711A extending in parallel with first floor surface portion 261, and a second bottom surface portion 711B extending in parallel with second floor surface portion 262. Cover member 270 of case member 200 and an upper surface 712 of housing 710 of electronic component unit 700 extend in parallel with first floor surface portion 261. Therefore, second floor surface portion 262 extends in the direction obliquely intersecting cover member 270 of case member 200 and upper surface 712 of housing 710 of electronic component unit 700.

In the battery pack shown in FIG. 7, housing 710 of electronic component unit 700, which is fed with an impact load in the lateral direction, is moved along second floor surface portion 262. On this occasion, as shown in FIG. 7, the load acting on electronic component unit 700 is decomposed in the vertical direction (Z axis direction) and the lateral direction (X axis direction and Y axis direction). As a result, the impact load in the lateral direction, which brings electronic component unit 700 closer to side surface portion 230, is reduced.

Since the impact load in the lateral direction acting on electronic component unit 700 can be reduced in the battery pack according to the present embodiment as described above, electronic component unit 700 can be protected without providing an excessively large cushioning mechanism. Further, since inner space 210 of case member 200 can be effectively utilized in a portion A2 in FIG. 7, case member 200 can be downsized, with the result that the size and weight of the battery pack can be reduced. Further, with the reduction of cost for the member, it can be also expected to exhibit an effect of reducing manufacturing cost of the battery pack.

FIG. 8 is a perspective view showing surroundings of the electronic component unit. FIG. 9 is a diagram showing a state of the electronic component unit shown in FIG. 8 when viewed in the Y axis direction.

As shown in FIGS. 8 and 9, connector 600 is provided at side surface portion 240 of case member 200. Connector 600 constitutes a power supply port for battery cells 100 and electronic component unit 700 accommodated in case member 200.

Housing 710 of electronic component unit 700 accommodates electronic components including main relays 720, a shunt resistor 730, a cement resistor 740, bus bars 750, and a current sensor 760. Other electronic components not shown in FIGS. 8 and 9 may be accommodated in housing 710, such as a fuse and a pre-charge relay.

The electronic components accommodated in housing 710 include: first electronic components (for example, main relays 720, current sensor 760, and the like) each having a relatively large height in the Z axis direction; and second electronic components (for example, shunt resistor 730, cement resistor 740, and bus bars 750) each having a relatively small height in the Z axis direction. Since the second electronic components each having a small height are disposed close to the side surface portion 240 side with respect to the first electronic components each having a large height, inner space 210 of case member 200 located on second floor surface portion 262 can be effectively utilized.

In the example shown in FIGS. 8 and 9, housing 710 of electronic component unit 700 is not located on first floor surface portion 261, and is located only on second floor surface portion 262 that is an inclined surface. Also in electronic component unit 700 shown in FIGS. 8 and 9, as with the example of FIG. 7, the impact load in the lateral direction acting on electronic component unit 700 can be reduced.

Each of FIGS. 10A and 10B is a diagram showing an impact absorbing portion 751 (cushioning structure) formed in bus bar 750. Impact absorbing portion 751 is formed to have a curved shape. When an impact is applied in the lateral direction (direction orthogonal to the Z axis direction), impact absorbing portion 751 can be deformed from a state shown in FIG. 10A to a state shown in FIG. 10B so as to collapse while absorbing the impact load.

Bus bar 750 is fixed to an electrical component and connector 600 in order to electrically connect the electrical component accommodated in housing 710 to connector 600. Since bus bar 750 is deformed while absorbing the load in the lateral direction, the impact load in the lateral direction acting on electronic component unit 700 can be reduced. Further, although not shown in the figures, also when an impact is applied in a direction opposite to the above-described lateral direction (direction orthogonal to the Z axis direction), the impact load can be also reduced while impact absorbing portion 751 is deformed to further expand from the state shown in FIG. 10A.

Bus bar 750 may be composed of, for example, copper or aluminum in the form of a plate. When bus bar 750 is composed of aluminum, the weight can be reduced and impact absorbing portion 751 can be readily deformed as compared with a case where bus bar 750 is composed of copper. Further, as the bus bar, not only the member in the form of a plate but also a harness may be used.

Next, referring to FIGS. 11 to 14, the following describes exemplary arrangements of cushioning ribs 800 (cushioning material) to reduce an impact on electronic component unit 700. As shown in FIGS. 11 to 14, cushioning ribs 800 may be provided between case member 200 (side surface portion 230, 240) and electronic component unit 700 (housing 710). Cushioning ribs 800 may be formed in one piece with case member 200 using the same material as that of case member 200.

FIG. 11 is a top view showing an exemplary arrangement of the cushioning material, and FIG. 12 is a side view of the structure shown in FIG. 11. In the example shown in FIGS. 11 and 12, cushioning ribs 800 are provided only on side surface portion 240 that is located on the tip side of second bottom surface portion 711B of electronic component unit 700 and that extends in the Y axis direction.

FIG. 13 is a top view showing another exemplary arrangement of the cushioning material, and FIG. 14 is a side view of the structure shown in FIG. 13. In the example shown in FIGS. 13 and 14, cushioning ribs 800 are provided not only on side surface portion 240 extending in the Y axis direction but also on side surface portion 230 extending in the X axis direction.

FIG. 15 is a diagram showing an exemplary arrangement of respective configuration units in the battery pack. In the example shown in FIG. 15, a control unit 900 including a control board is disposed above electronic component unit 700. The control board of control unit 900 includes a control circuit connected to an electronic component in electronic component unit 700 and connected to battery cells 100.

In the present embodiment, an inclination angle of second floor surface portion 262 with respect to first floor surface portion 261 is, for example, about 30° or less, but the inclination angle is not limited thereto. The length of second floor surface portion 262 in the X axis direction is, for example, about ⅓ or more and ½ or less of the total length of case member 200 in the X axis direction, but the length of second floor surface portion 262 is not limited thereto. The upper end of second floor surface portion 262 is separated from first floor surface portion 261 by about 150 mm or less in the Z axis direction, but the height of the upper end of second floor surface portion 262 is not limited thereto. The installation range and inclination angle of second floor surface portion 262 can be appropriately changed in accordance with the size of case member 200 and the number of battery cells 100. The inclination angle of second floor surface portion 262 may be varied at a certain portion of second floor surface portion 262.

Although the embodiments of the present invention have been described and illustrated in detail, it is clearly understood that the same is by way of illustration and example only and is not to be taken by way of limitation, the scope of the present invention being interpreted by the terms of the appended claims. The scope of the present invention is defined by the terms of the claims, and is intended to include any modifications within the scope and meaning equivalent to the terms of the claims.

What is claimed is:

1. A battery pack comprising:

a stack of a plurality of battery cells;

an electronic component unit including an electronic component and a housing that accommodates the electronic component; and a case member that accommodates the stack of the plurality of battery cells and the electronic component unit, wherein the housing of the electronic component unit has a bottom surface, the case member has a floor surface that supports the bottom surface of the housing, and the floor surface of the case member includes:

a first floor surface portion extending along a first plane and supporting the stack of the plurality of battery cells, and a second floor surface portion extending along a second plane obliquely intersecting the first plane, wherein the bottom surface of the housing of the electronic component unit is in contact with and supported by both the first floor surface portion and the second floor surface portion and the stack of the plurality of battery cells is provided outside of the housing of the electronic component unit and apart from the electronic component unit in the case member.

2. The battery pack according to claim 1, wherein at least a portion of the bottom surface of the housing extends along the second plane.

3. The battery pack according to claim 1, wherein the bottom surface of the housing includes a first bottom surface portion extending along the first plane and a second bottom surface portion extending along the second plane.

4. The battery pack according to claim 1, wherein at least a portion of the bottom surface of the housing extends along the second plane, and the bottom surface of the housing includes a first bottom surface portion extending along the first plane and a second bottom surface portion extending along the second plane.

5. The battery pack according to claim 1, wherein the case member has a side surface rising from the floor surface, the battery pack further comprising a cushioning material provided between the housing of the electronic component unit and the side surface of the case member.

6. The battery pack according to claim 1, wherein at least a portion of the bottom surface of the housing extends along the second plane, and the case member has a side surface rising from the floor surface, the battery pack further comprising a cushioning material provided between the housing of the electronic component unit and the side surface of the case member.

7. The battery pack according to claim 1, wherein the bottom surface of the housing includes a first bottom surface portion extending along the first plane and a second bottom surface portion extending along the second plane, and the case member has a side surface rising from the floor surface, the battery pack further comprising a cushioning material provided between the housing of the electronic component unit and the side surface of the case member.

8. The battery pack according to claim 1, wherein at least a portion of the bottom surface of the housing extends along the second plane, the bottom surface of the housing includes a first bottom surface portion extending along the first plane and a second bottom surface portion extending along the second plane, and the case member has a side surface rising from the floor surface, the battery pack further comprising a cushioning material provided between the housing of the electronic component unit and the side surface of the case member.

9. The battery pack according to claim 1, wherein the plurality of battery cells and the electronic component unit are arranged side by side along a direction parallel to the first plane.

10. The battery pack according to claim 1, wherein at least a portion of the bottom surface of the housing extends along the second plane, and the plurality of battery cells and the electronic component unit are arranged side by side along a direction parallel to the first plane.

11. The battery pack according to claim 1, wherein the bottom surface of the housing includes a first bottom surface portion extending along the first plane and a second bottom surface portion extending along the second plane, and the plurality of battery cells and the electronic component unit are arranged side by side along a direction parallel to the first plane.

12. The battery pack according to claim 1, wherein the case member has a side surface rising from the floor surface, the battery pack further comprising a cushioning material provided between the housing of the electronic component unit and the side surface of the case member, wherein the plurality of battery cells and the electronic component unit are arranged side by side along a direction parallel to the first plane.

13. The battery pack according to claim 1, further comprising a control unit provided beside the electronic component unit along a normal direction of the first plane, the control unit including a circuit connected to at least one of the electronic component of the electronic component unit and each of the plurality of battery cells.

14. The battery pack according to claim 1, wherein at least a portion of the bottom surface of the housing extends along the second plane, the battery pack further comprising a control unit provided beside the electronic component unit along a normal direction of the first plane, the control unit including a circuit connected to at least one of the electronic component of the electronic component unit and each of the plurality of battery cells.

15. The battery pack according to claim 1, wherein the bottom surface of the housing includes a first bottom surface portion extending along the first plane and a second bottom surface portion extending along the second plane, the battery pack further comprising a control unit provided beside the electronic component unit along a normal direction of the first plane, the control unit including a circuit connected to at least one of the electronic component of the electronic component unit and each of the plurality of battery cells.

16. The battery pack according to claim 1, wherein the case member has a side surface rising from the floor surface, the battery pack further comprising:

a cushioning material provided between the housing of the electronic component unit and the side surface of the case member; and a control unit provided beside the electronic component unit along a normal direction of the first plane, the control unit including a circuit connected to at least one of the electronic component of the electronic component unit and each of the plurality of battery cells.

17. The battery pack according to claim 1, wherein the plurality of battery cells and the electronic component unit are arranged side by side along a direction parallel to the first plane, the battery pack further comprising a control unit provided beside the electronic component unit along a normal direction of the first plane, the control unit including a circuit connected to at least one of the electronic component of the electronic component unit and each of the plurality of battery cells.

18. A battery pack comprising:

a stack of a plurality of battery cells;

an electronic component unit including an electronic component and a housing that accommodates the electronic component; and a case member that accommodates the stack of the plurality of battery cells and the electronic component unit, wherein the housing of the electronic component unit has a bottom surface, the case member has a floor surface that supports the bottom surface of the housing, and an upper surface that faces the floor surface, the floor surface of the case member includes:

a first floor surface portion extending along a first plane and supporting the stack of the plurality of battery cells, and a second floor surface portion extending along a second plane obliquely intersecting the first plane and supporting the electronic component unit, wherein the bottom surface of the housing of the electronic component unit is in contact with and supported by both the first floor surface portion and the second floor surface portion and the stack of the plurality of battery cells is provided outside of the housing of the electronic component unit and apart from the electronic component unit in the case member and the upper surface of the case member extends parallel to the first plane.

19. The battery pack according to claim 18, wherein the bottom surface of the housing includes a portion that extends along the second plane.

\* \* \* \* \*